Jan. 2, 1951 T. C. GOGGIN 2,536,168
AMPHETAMINE CHEWING GUM
Filed Sept. 29, 1947
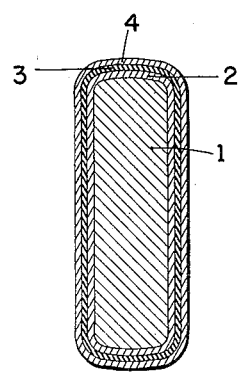
INVENTOR
THEODORE C. GOGGIN
BY
HIS ATTORNEY Patented Jan. 2, 1951

2,536,168

UNITED STATES PATENT OFFICE 2,536,168

AMPHETAMINE CHEWING GUM

Theodore C. Goggin, Pitman, N. J., assignor to Clark & Clark Co., Wenonah, N. J., a corporation of Delaware Application September 29, 1947, Serial No. 776,799

5 Claims. (Cl. 167—82)

My invention relates to an amphetamine chewing gum. More particularly, it concerns a standard form of coated, chicle chewing gum that has been processed in such a way as to provide a predetermined dosage of a water-soluble salt of amphetamine (1-phenyl-2-aminopropane) entirely within the coating.

Amphetamine and its water-soluble salts, such as the hydrochloride, sulfate and phosphate, have a pronounced therapeutic effect, particularly as a stimulant for the central nervous system. The water-soluble salts are suitable for oral administration and are generally made up in the form of tablets with the customary excipients, such as milk-sugar, and with or without other therapeutic substances, such as aspirin, phenacetin, thyroid extract, atropine sulfate, aloin, phenobarbital, etc. These tablets are widely prescribed in the treatment of a variety of ailments and conditions, such as despondency, fatigue, obesity, alcoholism, narcolepsy, dysmenorrhea, and the like.

It is an object of my invention to provide the water-soluble amphetamine salts in a highly convenient and desirable form for oral administration. Another object is to prepare a chewing gum bearing a coating containing an effective dose of such an amphetamine salt. Yet another object is to associate the therapeutic agent with the chewing gum in such a manner that prompt and complete absorption of the therapeutic agent by the body is assured. A still further object is to protect the water-soluble amphetamine salt in the coating by superimposing a protective layer or layers that are impervious to air and moisture. Additional objects will become apparent from the detailed description that follows.

I have found that a full and rapid action of the water-soluble amphetamine salt is assured, if this therapeutic agent is incorporated in and limited to a separate layer forming part of the coating of a standard form of chewing gum. Precautions should be observed to prevent penetration of the amphetamine salt into the chewing gum and a protective outer coating should be provided to prevent access of air and moisture to the layer containing the amphetamine salt. In this manner the entire dosage of the therapeutic agent is made quickly available, in a very palatable form when the gum is chewed.

I prefer to employ for my purposes the conventional square pieces of uncoated chicle chewing gum that are readily available on the market for processing as a commercial confection. These pieces weigh slightly over one gram each. More precisely, there are about 410 to 420 pieces per pound, before they are processed as described hereinafter. Such processing involves the application of at least three, primary or basic layers to each piece of chewing gum. The first of these layers includes a material that is designed to prevent any possible penetration of the amphetamine salt into the underlying gum unit. The next layer includes all of the predetermined dosage of the amphetamine salt. The final layer is air and moisture impervious, thus serving to protect the therapeutic content of the second layer and any flavoring ingredients present over considerable periods of time. Each of these three basic layers may advantageously be composed of several individual coatings, in order best to accomplish their functions.

My invention may be illustrated by referring to the accompanying drawing which shows a greatly enlarged cross section through one of the coated pieces of chewing gum prepared according to my invention. As may be seen from said drawing, a conventional square piece of chicle chewing gum 1 is uniformly coated with the three, superimposed, basic layers referred to above. 2 represents the layer that prevents penetration of the therapeutic agent into the underlying chewing gum 1. 3 represents the layer containing the therapeutic agent, and 4 the layer that serves to protect the therapeutic agent. As indicated above, these layers may in turn be composed of several individual coatings, but no attempt is made to show such in the drawing. The basic layers also serve a number of additional functions, such as bearing the sweetening and flavoring ingredients, and imparting to the final product an attractive appearance.

The following, specific example will further serve to illustrate my invention. It is to be understood that this invention is not limited to the details described therein.

Example

Commercially available, square pieces of uncoated, chicle chewing gum running about 410 to 420 pieces to the pound are subjected to the following processing operation:

The pieces are first coated with a solution of sucrose in a standard type of pharmaceutical coating pan. I prefer to employ a syrup containing approximately 85% by weight of sucrose. Before this coating has completely dried, powdered acacia is applied thereto, in order to render it completely impervious to the passage of any of the amphetamine salt that is applied thereover subsequently.

The so coated pieces are then subjected to a second coating operation, again in a standard type of pharmaceutical coating pan. The coating composition that is applied in this second step is prepared by dissolving 1.7 kilograms of sucrose in 2 liters of distilled water and then adding 265.4 grams of monobasic, racemic amphetamine phosphate. When employing other, water-soluble amphetamine salts, equimolecular quantities are added.

The coating composition, thus prepared, adheres satisfactorily to the layer initially described, and dries in the air within about five minutes. Drying may be accelerated, if desired, by heating or by using hot, dry air. It is desirable to apply from 9 to 12 of such coatings successively, in order to insure the desired, predetermined dosage of the amphetamine salt on each piece of chewing gum. Such dosage, in the case of amphetamine phosphate, may vary no more than 0.00075 gram per piece. By using a coating composition made up as described, it is possible to control the dosage within said narrow limit and to insure ample adhesion. Before the final coating making up the second basic layer has dried, I again dust the pieces with acacia powder, in order to prepare the so coated pieces for the application of the final, protective layer.

The final, protective layer is made up of a number of finishing and protective coatings. These are applied in the usual manner, as described above. The individual coatings contain flavoring, coloring and polishing ingredients that are added to make a finished, stable and commercially acceptable product. At least one of them, preferably the last, includes a water-proof and preservative type of coating wax, such as carnauba wax, which is chosen because of its high melting point and hardness. After drying the final coating, the coated gum pieces are ready for packaging and use.

The foregoing details may, of course, be varied widely. If desired, the flavoring materials may be wholly or partly included in the initial coating composition making up the bulk of the first basic layer. Several protective coatings may be included in the final basic layer. Instead of using amphetamine phosphate in the second basic layer, one may employ other water-soluble amphetamine salts, such as the sulfate and hydrochloride. Similarly, one may employ in place of the acacia powder, other suitable dusting powders, such as powdered gelatin, keratin and various stearates. Many other such variations within the scope of my invention will readily occur to those skilled in the art. My invention is not limited to such details, but includes all modifications and variations coming within the scope of the appended claims.

I claim:

1. A medicated chewing gum having a piece of chewing gum chicle coated with a plurality of sugar layers each containing a water-soluble amphetamine salt said sugar layers being separated from the chicle by an intervening layer of sugar coated with a dusting powder that prevents passage of the amphetamine salt, and said amphetamine-salt-containing sugar layers being protected from external moisture by an enveloping sugar layer containing a water-proof wax.

2. A medicated chewing gum having a piece of chewing gum chicle covered with a plurality of sugar layers each containing a water-soluble amphetamine salt, said sugar layers being separated from the chicle by an intervening layer of sugar coated with a dusting powder that prevents passage of the amphetamine salt, and said amphetamine-salt-containing-sugar layers being protected from external moisture by an enveloping second layer of said dusting powder and a sugar layer containing a water-proof wax around the dusting powder.

3. A chewing gum as defined by claim 1 wherein the dusting powder is composed of acacia gum.

4. A chewing gum as defined by claim 1 wherein the dusting powder is composed of gelatin.

5. A chewing gum as defined by claim 1 wherein the dusting powder is composed of keratin.

THEODORE C. GOGGIN.

REFERENCES CITED

The following references are of record in the file of this patent:

UNITED STATES PATENTS

| Number | Name | Date |
|---|---|---|
| 312,041 | Upjohn | Feb. 10, 1885 |
| 2,031,233 | Stillwell | Feb. 18, 1936 |
| 2,146,867 | Welin | Feb. 14, 1939 |
| 2,262,087 | Bartlett | Nov. 11, 1941 |
| 2,304,246 | Ekert | Dec. 8, 1942 |
| 2,410,417 | Andersen | Nov. 5, 1946 |

FOREIGN PATENTS

| Number | Country | Date |
|---|---|---|
| 249,816 | Great Britain | Jan. 20, 1927 |

OTHER REFERENCES

Klinische Wochenschrift, page 483, 1939.

Bakacs-Zentralblatt für Gynokologie, August 25, 1938, pp. 1893 to 1898.

Extra Pharmacopoeia, vol. 2, 21st ed., page 341, 1938.

U. S. Dispensatory, 23 ed., pages 1243, 1244, 1943.